United States Patent
Jain et al.

(10) Patent No.: US 8,600,863 B2
(45) Date of Patent: Dec. 3, 2013

(54) FINANCIAL SERVICES CARD THAT PROVIDES VISUAL INDICATOR ACCORDING TO AVAILABLE BALANCE DEFINED POLICIES

(75) Inventors: Bhushan Pradip Jain, Jalgaon (IN); Fahad Mahmood, Allahabad (IN); Ravindra Mohan Mijar, Pune (IN); Dhaval Kiritbhai Shah, Nadiad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/351,093

(22) Filed: Jan. 16, 2012

(65) Prior Publication Data

US 2013/0185201 A1 Jul. 18, 2013

(51) Int. Cl.
*G06Q 40/00* (2012.01)
(52) U.S. Cl.
USPC ............................................................ 705/37
(58) Field of Classification Search
None
See application file for complete search history.

(56) References Cited

U.S. PATENT DOCUMENTS

| | | | |
|---|---|---|---|
| 6,032,859 A | 3/2000 | Muehlberger et al. | 235/449 |
| 6,078,904 A * | 6/2000 | Rebane | 705/36 R |
| 6,915,277 B1 | 7/2005 | Manchester et al. | 705/39 |
| 7,363,265 B2 | 4/2008 | Horgan | 705/35 |
| 7,635,083 B2 | 12/2009 | Fukuda et al. | 235/379 |
| 7,912,784 B2 | 3/2011 | Sobek | 705/39 |
| 2006/0078100 A1 | 4/2006 | Risafi et al. | 379/114.2 |
| 2008/0006685 A1 | 1/2008 | Rackley, III et al. | 235/379 |
| 2008/0040265 A1 | 2/2008 | Rackley, III et al. | 705/40 |
| 2009/0078777 A1 * | 3/2009 | Granucci et al. | 235/492 |
| 2009/0187432 A1 * | 7/2009 | Scalet et al. | 705/4 |
| 2009/0254466 A1 * | 10/2009 | Karkanias et al. | 705/35 |
| 2010/0114724 A1 | 5/2010 | Ghosh et al. | 705/24 |
| 2010/0250812 A1 | 9/2010 | Webb et al. | 710/301 |
| 2011/0119185 A1 | 5/2011 | Drummond et al. | 705/43 |

FOREIGN PATENT DOCUMENTS

WO WO/2004/053786 * 6/2004

OTHER PUBLICATIONS

Anonymous, NDPL Announces Rebate on Pre-paid Power Recharge Coupons, The Hindu; The Financial Times Limited; Oct. 19, 2008 (abstract only).*
Boalt, Adam R., SecureCard Technologies Announces Innovative Secure Credit Card to Eliminate Fraud; PR Newswire; PR Newswire Association LLC; Nov. 21, 2006.*
McKay, Angela, Thai Group Grows on Europe's BSE Crisis; Solo Syndication; Dec. 10, 2000.*

(Continued)

*Primary Examiner* — Virpi Kanervo
(74) *Attorney, Agent, or Firm* — VanLeeuwen & VanLeeuwen; Jeffrey S. LaBaw (57) ABSTRACT

An approach is provided that displays visual indicators on a financial services card, such as a credit or debit card, that indicates the user's balance at a financial services provider. Available funds data is received at a financial services card that includes visual indicators (e.g., LEDs, etc.), a memory, a processor, a power source, and a wireless transmitter. The available funds data is received via the wireless transmitter. Visual indicators are selected based on the available funds data received from the financial services provider. The selected visual indicators are activated by providing power to the indicators from the power source. In one embodiment, the power source is a piezoelectric material, such as a piezoelectric crystal, that generates power to activate the visual indicators and run the processors and wireless transmitter based on manipulation of the card (e.g., applying pressure, etc. to the card) by the user.

21 Claims, 9 Drawing Sheets

(56) References Cited

OTHER PUBLICATIONS

Liew et al., "Smart Card II—Use of a thin outline pager as a credit card with OTA balance/payment and credit updates," Motorola, Inc., Jul. 1995, 1 page.
Warnick, "7 reasons your credit card gets blocked," creditcard.com, Aug. 6, 2010, 4 pages.
Ferguson, "How to Determine a Balance on a Debit Card," eHow.com, 1999, 4 pages.
Richardson, How to Check the Balance on a Debit Card, eHow.com, 1999, 5 pages.
Kanellos, "An LED ticker in your credit card?" CNET News, May 16, 2007, 5 pages.
Davies, "MasterCard trialling smart credit cards with display & keypads," SlashGear, Jun. 10, 2010, 8 pages.
"Smarter money for a smarter planet," International Business Machines Corporation, publication date unknown, 1 page.

\* cited by examiner

FINANCIAL SERVICES CARD THAT PROVIDES VISUAL INDICATOR ACCORDING TO AVAILABLE BALANCE DEFINED POLICIES

TECHNICAL FIELD

The present disclosure relates to an approach that provides a financial services card, such as a credit or debit card, with visual indicators that inform the user as to the available balance.

BACKGROUND OF THE INVENTION

Use of credit card/financial services card is increasing rapidly and is gaining widespread acceptance by people. Financial services card usage provides users flexibility to use it for multiple purposes as well as relieves users from the burden of carrying cash for transactions. Financial services cards are generally considered to be a safer medium than traditional cash. Automatic Teller Machine (ATM) cards have been used to provide variety of services apart from cash withdrawal such as balance inquiry, shopping, etc. However, these activities require interaction between the card and a device that can read the data encoded on the card, generally a magnetic card reader that reads a magnetic strip of information encoded on the card. Other types of financial services cards, such as credit and debit cards, have similar limitations in that the user is often forced to interact with a reading device often during checkout processing in order to determine whether a sufficient balance or credit is available to make a particular purchase.

SUMMARY

An approach is provided that displays visual indicators on a financial services card, such as a credit or debit card, that indicates the user's balance at a financial services provider. Available funds data is received at a financial services card that includes visual indicators (e.g., LEDs, etc.), a memory, a processor, a power source, and a wireless transmitter. The available funds data is received via the wireless transmitter. Visual indicators are selected based on the available funds data received from the financial services provider. The selected visual indicators are activated by providing power to the indicators from the power source. In one embodiment, the power source is a piezoelectric material, such as a piezoelectric crystal, that generates power to activate the visual indicators and run the processors and wireless transmitter based on manipulation of the card (e.g., applying pressure, etc. to the card) by the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
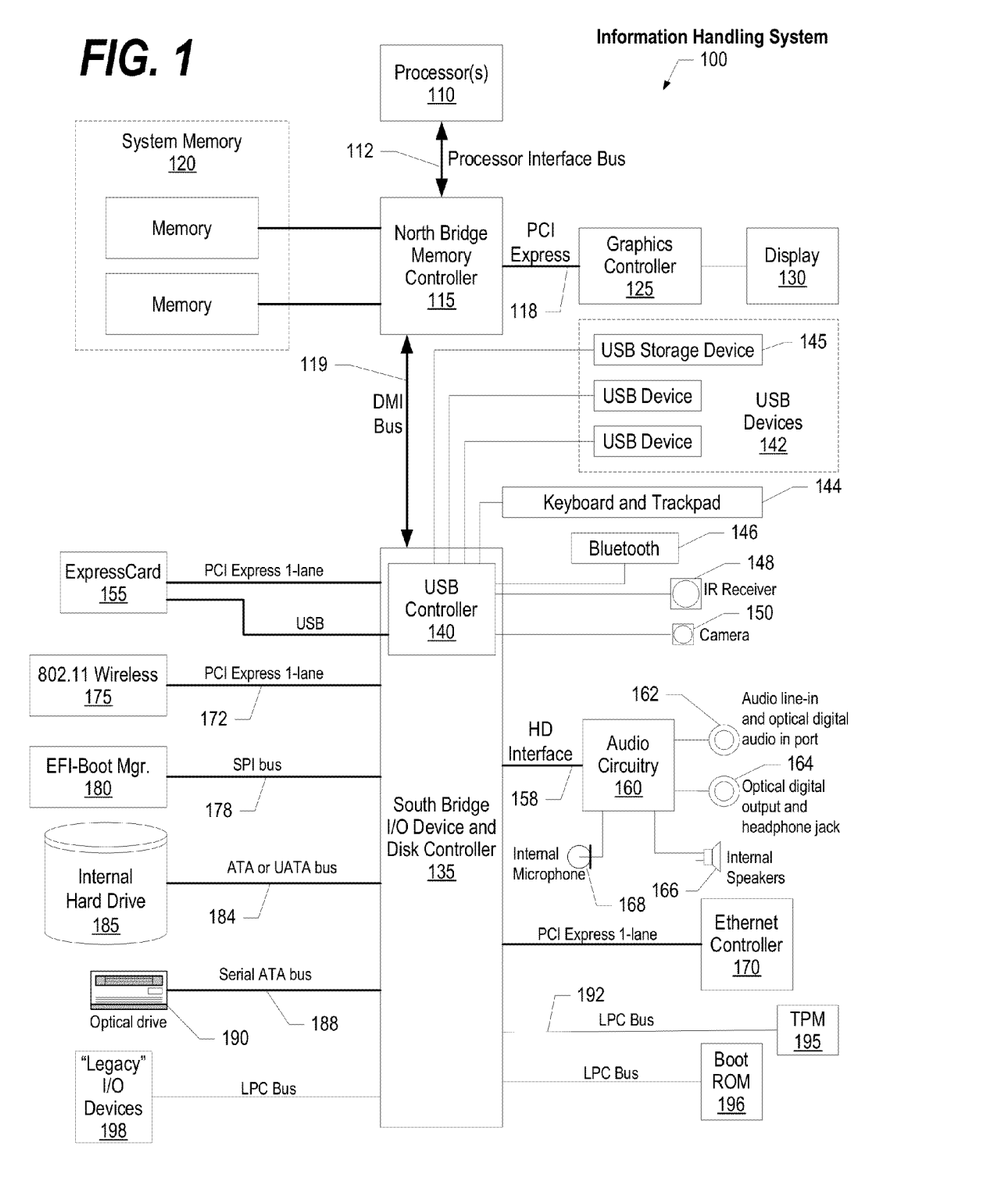
FIG. 1 is a block diagram of a data processing system in which the methods described herein can be implemented.
Figure 2:
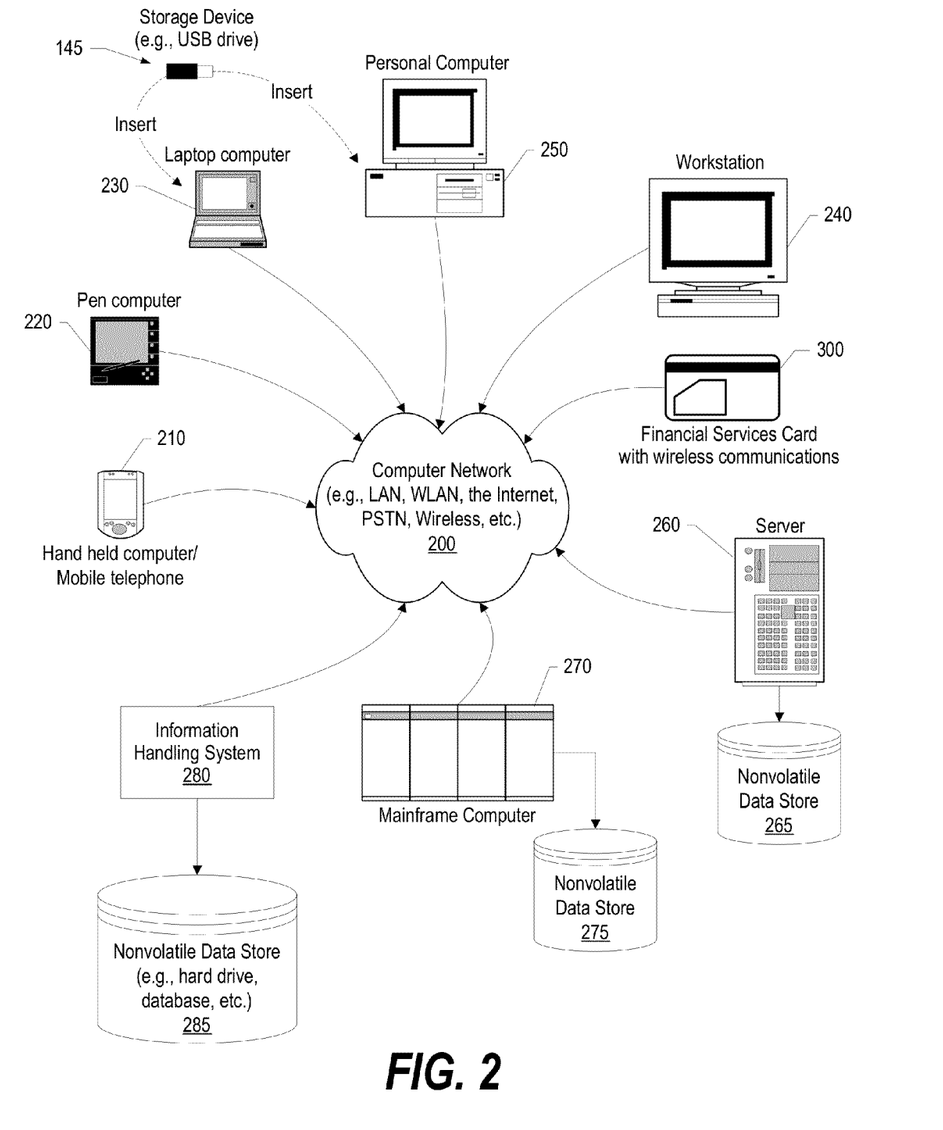
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems. As described herein, financial services card 300 is an information handling system that communicates with other systems using a wireless adapter via network 200.

FIGS. 3-9 describe an approach that uses a financial services card, such as a debit or credit card, to inform a user of the card of balance data. In one embodiment, the balance data is conveyed to the user in a manner that conceals the balance data from non-users that do not know how the balance data indicators were configured.

Figure 3:
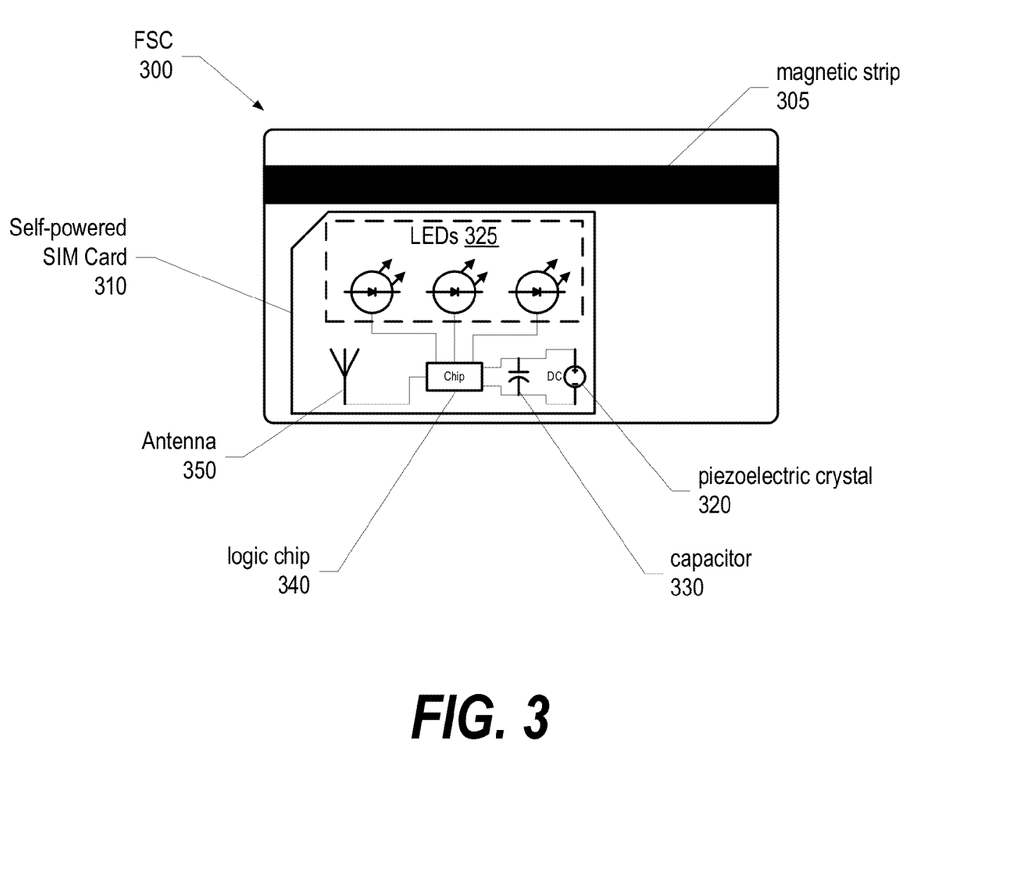
FIG. 3 is a diagram of a financial services card that includes visual indicators that inform a user as to a balance associated with the card.

FIG. 3 is a diagram of a financial services card that includes visual indicators that inform a user as to a balance associated with the card. In one embodiment, financial services card 300 performs like a traditional financial services card in order to provide payment at a merchant, such as by swiping magnetic strip 305 in a card reader or by taking an imprint of the raised account information (name, account number, etc.) on the front of the card (not shown). In addition, financial services card 300 provides additional functionality not found in traditional financial services card. Self-powered SIM card 310 receives power from piezoelectric material 320 which charges capacitor 330. The electric current generated by piezoelectric material 320 is used to provide charge in order to operate logic chip 340 (such as a processor, etc.). Logic chip 340 identifies which visual indicators 325 are activated to inform the user of the user-specified funds range that is available for use with the financial services card. While light emitting diodes (LEDs) are shown as being the visual indicators, those skilled in the art will appreciate that many other visual indicators (e.g., mini-displays, liquid crystal displays (LCDs), etc.). The current available funds data is received from a financial services provider at network adapter 350, such as an integrated antenna, which is used to both send and receive data from the financial services provider. In the embodiment shown, a piezoelectric material is used to generate the current with the piezoelectric material generating the current based on applied mechanical stress applied to the piezoelectric material (e.g., pressing, squeezing the material, etc.). In one embodiment, the financial services card's power consuming components receive their power from an external power source (e.g., battery, etc.) rather than from an included piezoelectric material.

As previously mentioned, the activation of the visual indicators is based on user-specified funds ranges. In the example shown, three visual indicators are provided so the user could specify that if the available funds balance is less than $100 then the left-most visual indicator should be activated, if a range between $100 and $500 is available, then the middle visual indicator should be activated, and if more than $500 is available, then the right most visual indicator should be activated. In addition, combinations of indicators could also be specified for different available funds ranges. A stranger who sees the card and the activated indicator would not know the meaning behind the activated indicators because the visual indicators correspond with user-specified funds ranges. Likewise, a different user of a different financial services card could provide completely different user-specified funds ranges (e.g., the right-most indicator activated when balance below $1,000, the left-most indicator activated when the balance is between $1,000 and $5,000, and the middle indicator activated when the balance is greater than $5000). In this manner, the user of the financial services card is made aware of the available funds associated with the financial services card while a stranger, not knowing the user-specified funds ranges, would not understand the meaning behind the activated indicators.

Figure 4:
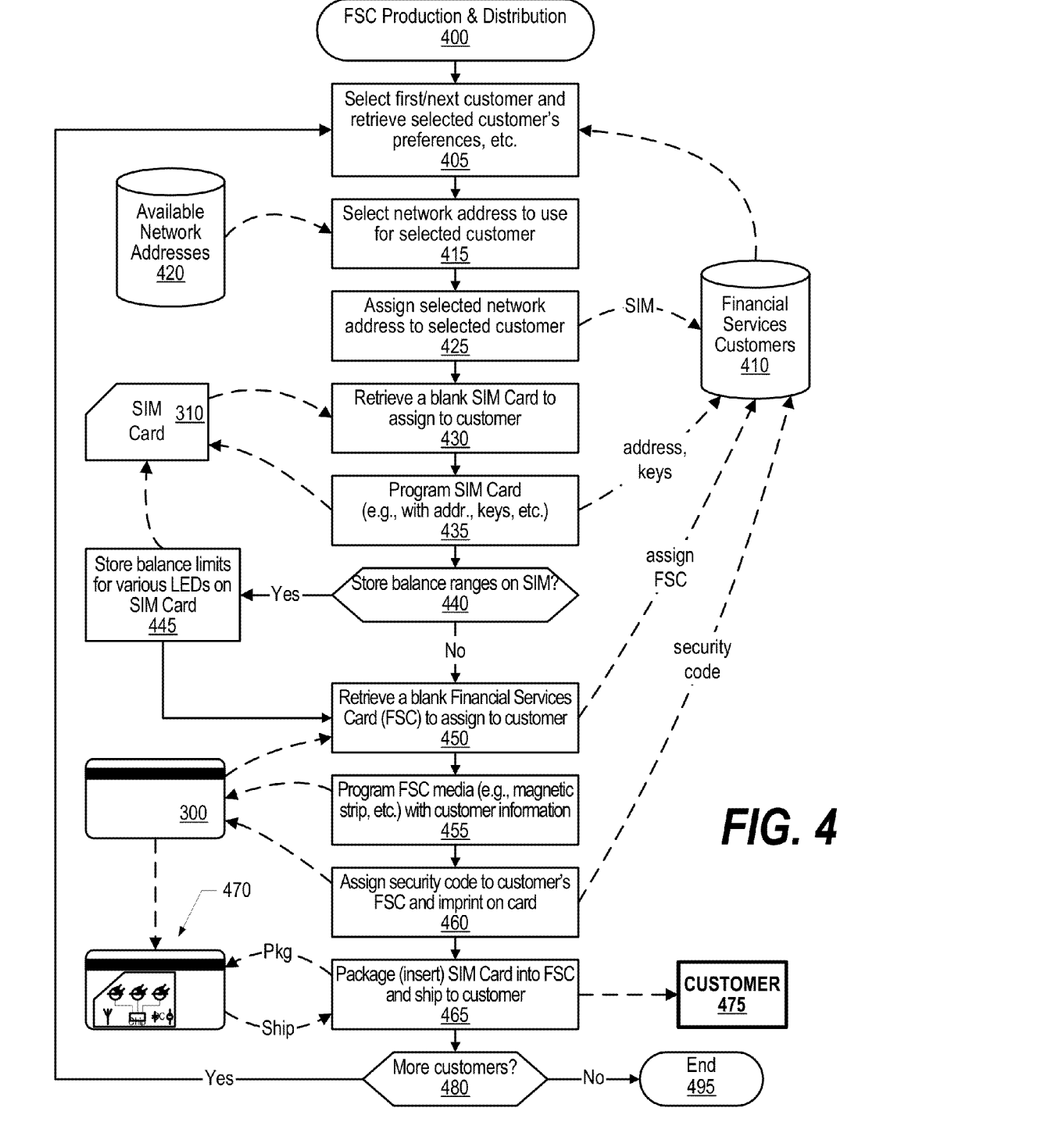
FIG. 4 is a flowchart showing steps performed during financial service card production by a financial services provider and distribution of the cards to customers.

FIG. 4 is a flowchart showing steps performed during financial service card production by a financial services provider and distribution of the cards to customers. Processing by the financial services provider (e.g., bank, credit card provider, etc.) commences at 400 whereupon, at step 405, the first customer (user) that will receive a financial services card is selected from data store 410 that includes account information pertaining to the financial services provider's customers. At step 415, the financial services provider selects a network address to be used by this customer from available network addresses 420. In one embodiment, each customer receives a unique network address so that the financial services provider can contact each of the customers over the network. In another embodiment, each customer receives a unique identifier that is used in conjunction with multiple network addresses that are shared amongst the various customers. At step 425, the selected network address is assigned to the selected customer and the network address is added to the customer's data stored in data store 410.

At step 430, the financial services provider process retrieves a blank integrated circuit card, such as subscriber identification module (SIM) card 310, that will be incorporated with the financial services card issued to the customer. At step 435, the integrated circuit card is programmed with the selected customer's information including account information, encryption key data, and network address data including both the network address assigned to the selected customer as well as the network address of the financial services provider that the financial services card will contact to obtain account information. The data stored on the integrated circuit card is also stored in data store 410.

A decision is made as to whether the user-specified funds ranges are stored on the integrated circuit (SIM) card or are maintained at the financial services provider's computer system (decision 440). If the user-specified funds ranges are stored on the integrated circuit card, then decision 440 branches to the "yes" branch whereupon, at step 445, the user-specified funds ranges are stored on the integrated circuit card along with the visual identifiers (e.g., LEDs, etc.) associated with the various ranges. If the user-specified funds ranges are stored on the financial services provider's computer system then decision 440 branches to the "no" branch bypassing step 445.

At step 450, a blank financial services card (300) is retrieved and assigned to the selected customer. A unique identifier included on the card is associated with the selected customer and stored in data store 410. At step 455, the financial services card media, such as a magnetic strip used for making purchases, is programmed with customer data, such as financial account information. In addition, the card may be imprinted with the customer's name and account number which would appear on the front of the financial services card. At step 460, a security code is assigned to the card and imprinted on the back of the financial services card. The assigned security code is also stored in data store 410 and associated with the selected customer.

At step 465, the financial services card is packaged with the integrated circuit (SIM) card so that the completed financial services card (470) includes the self-powered integrated circuit card with logic circuit, visual identifiers, and wireless adapter to communicate with the financial services provider. The completed financial services card is then delivered to selected customer 475 who is a user of the financial services card. As shown in subsequent figures, the user is able to configure the financial services card to provide user-specified funds ranges and associate the funds ranges with one or more visual indicators so that the visual indicators provide funds-related information to the user without revealing such sensitive and/or confidential information to others.

A decision is made as to whether the financial services provider has more customers to which financial services cards are to be created and distributed (decision 480). If there are more customers to process, then decision 480 branches to the "yes" branch which loops back to select and process the next customer as described above. This looping continues until there are not more customers to process at which time decision 480 branches to the "no" branch and processing ends at 495.

Figure 5:
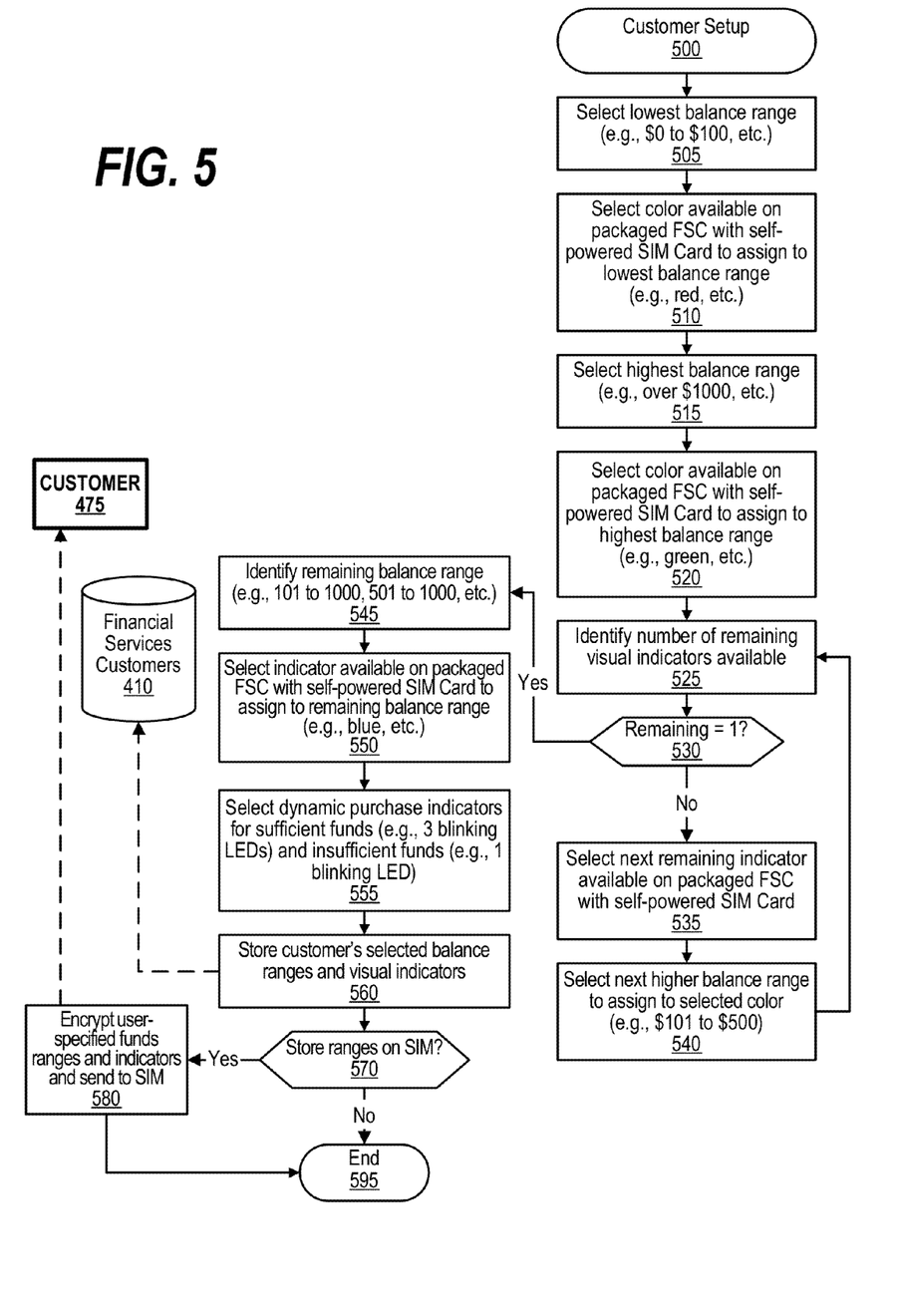
FIG. 5 is a flowchart showing steps performed by the financial services customer to setup the visual indicators provided on the card.

FIG. 5 is a flowchart showing steps performed by the financial services customer to setup the visual indicators provided on the card. Processing commences at 500 whereupon, at step 505, the customer selects the lowest balance range to assign to one or more visual indicators. For example, the customer may set the lowest user-specified funds range to be when the customer's balance is below $100. At step 510, the customer selects the visual indicator to associate with the lowest user-specified funds range. For example, the user may decide to associate the "red" visual indicator to become activated when the user's available funds data is less than $100.

At step 515, the customer selects the highest balance range to assign to one or more visual indicators. For example, the customer may set the highest user-specified funds range to be when the customer's balance is above $1,000. At step 520, the customer selects the visual indicator to associate with the highest user-specified funds range. For example, the user may decide to associate the "green" visual indicator to become activated when the user's available funds data is more than $1,000.

At step 525, the process identifies the number of remaining visual indicators that the user can configure with intermediate funds ranges. In one embodiment, combinations of visual indicators are also used in determining the number of available visual indicators. A decision is made as to whether the number of remaining visual indicators is one (decision 530). If the number of remaining visual indicators is greater than one, then decision 530 branches to the "no" branch whereupon, at step 535, the next available visual indicator (or combination thereof) is selected and, at step 540, the selected visual indicator is assigned a user-specified funds range (e.g., from $101 to $500, etc.). Processing then loops back to step 525 to identify the number of remaining visual indicators. This looping continues until there is only one remaining visual indicator, at which time decision 530 branches to the "yes" branch whereupon, at step 545, the process identifies the remaining balance range (e.g., $501 to $1,000, etc.) and, at step 550, this remaining balance range is assigned to the last remaining visual indicator.

At step 555, in one embodiment, the user can select dynamic purchase indicators that activate various visual indicators to indicate that a prospective purchase is within the available funds (sufficient funds) or is outside of the available funds (insufficient funds). For example, the user may select to have three visual indicators blink when there are sufficient funds for a prospective purchase and have a single visual indicator blink when there are insufficient funds for a prospective purchase. At step 560, the user-specified funds ranges and their associated visual indicators are stored in financial services provider's data store 410. In addition, the visual indicators selected by the user to indicate sufficient or insufficient funds for a prospective purchase are also stored in financial services provider's data store at step 560.

A decision is made as to whether the user-specified funds ranges are to be stored on the integrated circuit (SIM) card included in the financial services card issued to the customer (decision 570). If the user-specified funds ranges are to be stored on the customer's financial services card, then decision 570 branches to the "yes" branch whereupon, at step 580, the user-specified funds ranges are encrypted along with the associated visual indicators and this data is sent to the integrated circuit (SIM) card in the customer's financial services card (475) via the wireless adapter included in the financial services card.

Figure 6:
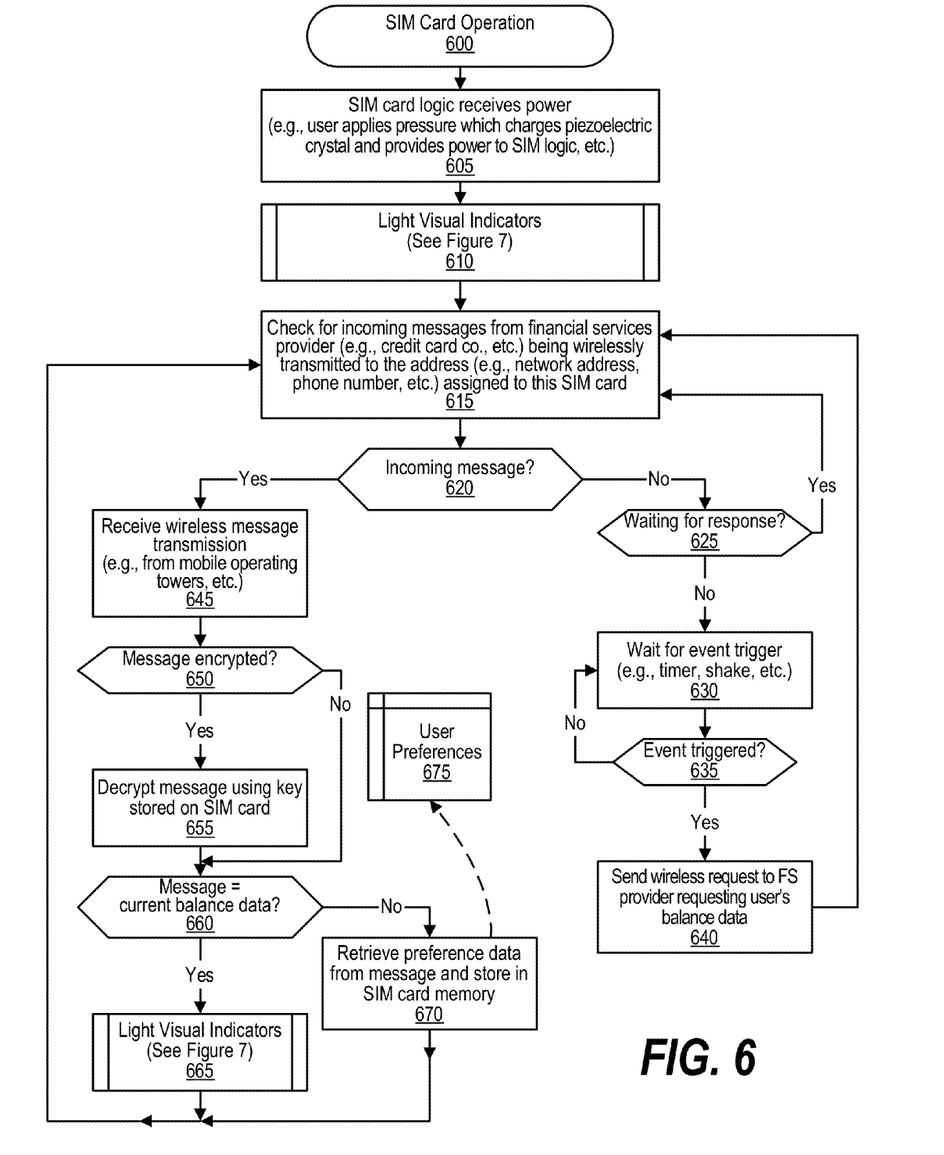
FIG. 6 is a flowchart showing steps performed in the logic included with the financial services card during card usage.

FIG. 6 is a flowchart showing steps performed in the logic included with the financial services card during card usage. Processing commences at 600 whereupon, at step 605, the integrated circuit (SIM) card receives power, such as by the user applying pressure to the piezoelectric material which produces a current that powers the logic circuit and other components included in the financial services card. At predefined process 610, the visual indicators are activated based on data currently available to the integrated circuit (SIM) card (see FIG. 7 and corresponding text for processing details). At step 615, the integrated circuit (SIM) card checks for incoming messages from the financial services provider that are wirelessly received at the financial services card's wireless adapter (e.g., antenna, etc.) with the messages being addressed to the network address (e.g., network address, phone number, etc.) assigned to this integrated circuit (SIM) card.

A decision is made as to whether there is an incoming message from the financial services provider (decision 620). If there is not an incoming message, then decision 620 branches to the "no" branch whereupon a decision is made as to whether the integrated circuit (SIM) card is waiting for a response from the financial services card responding to a previous request sent by the integrated circuit (SIM) card (decision 625). If the integrated circuit (SIM) card is waiting for a response from the financial services provider, then decision 625 branches to the "yes" branch which loops back to check (poll) for an incoming message from the financial services provider and this looping continues until the response is received from the financial services provider. On the other hand, if the integrated circuit (SIM) card is not waiting for a response from the financial services provider, then decision 625 branches to the "no" branch whereupon, at step 630, the integrated circuit (SIM) card waits for an event trigger to occur, such as the user shaking the financial services card, a timer to elapse, etc. A decision is made as to whether an event has been triggered (decision 635). If an event has not been triggered, then decision 635 branches to the "no" branch which loops back to wait for an event trigger to occur. When an event trigger occurs, then decision 635 branches to the "yes" branch whereupon, at step 640, the user's financial services card sends a wireless request to the financial services provider requesting the user's available funds data. Processing then loops back to step 615 to wait for the response from the financial services card.

Returning to decision 620, when an incoming message is received from the financial services provider, decision 620 branches to the "yes" branch to process the message. At step 645, the wireless message is received at the wireless adapter included in the financial services card (e.g., from mobile cell phone towers, satellites, etc.). A decision is made as to whether the message received from the financial services card has been encrypted (decision 650). If the message has been encrypted, then decision 650 branches to the "yes" branch whereupon, at step 655, the received message is decrypted using the keys stored in the memory of the integrated circuit (SIM) card that is included with the financial services card. On the other hand, if the message is not encrypted, then decision 650 branches to the "no" branch bypassing step 655.

A decision is made as to whether the message received from the financial services provider is available funds data corresponding to the financial services card (decision 660). If the message is available funds data, then decision 660 branches to the "yes" branch whereupon, at step predefined process 665, the visual indicators corresponding to the available funds data are activated (see FIG. 7 and corresponding text for processing details). On the other hand, if the message is not available funds data and is instead configuration data (e.g., user-specified funds ranges and associated visual indicators, etc.), then decision 660 branches to the "no" branch whereupon, at step 670, the configuration data is retrieved from the message and stored in user preferences memory area 675 within a memory of the integrated circuit (SIM) card. After the received message has been processed, processing loops back to step 615 to continue to wait for incoming messages from the financial services provider.

Figure 7:
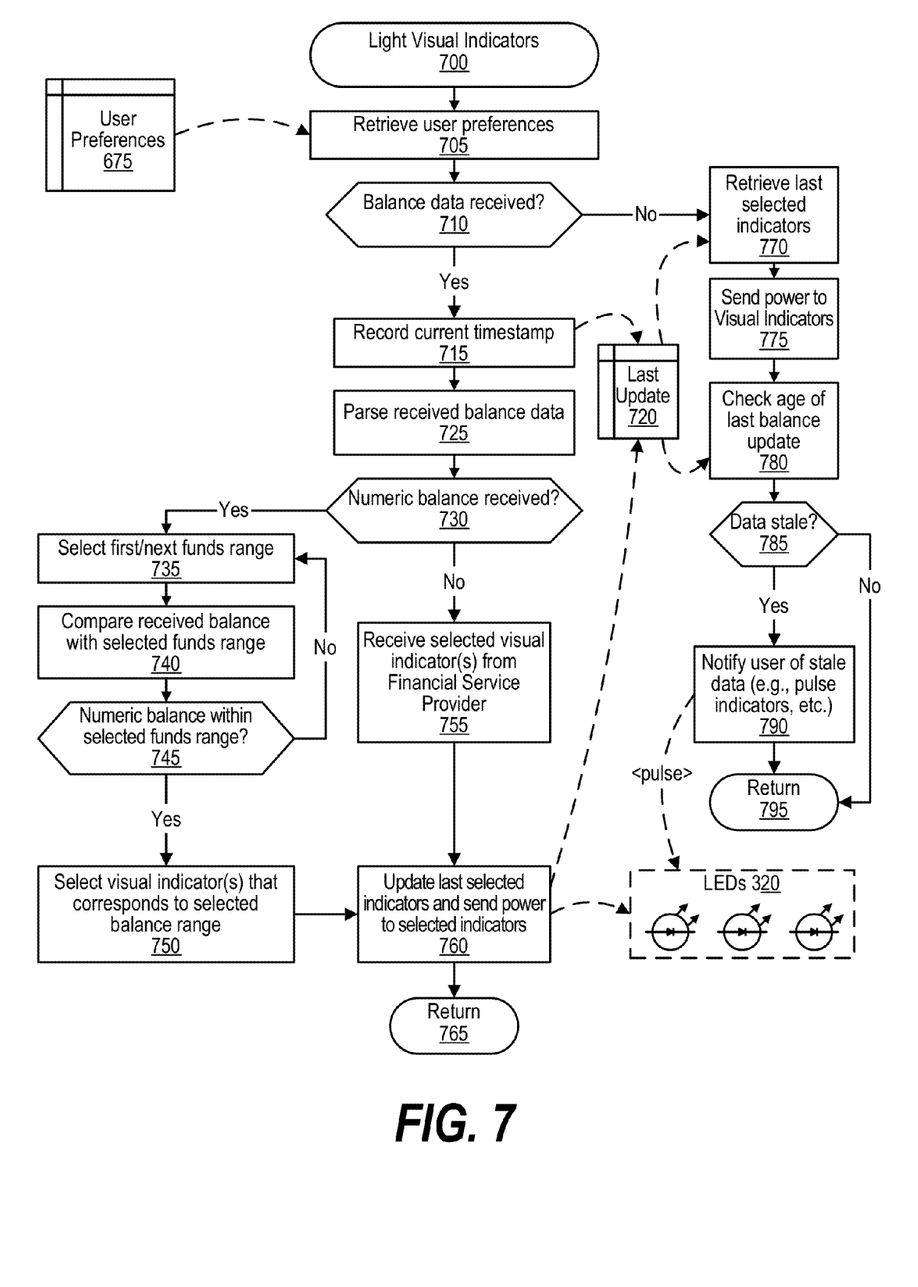
FIG. 7 is a flowchart showing steps performed in the logic of the financial services card to display the appropriate balance indicator.

FIG. 7 is a flowchart showing steps performed in the logic of the financial services card to display the appropriate balance indicator. Processing commences at 700 whereupon, at step 705, the user-specified preferences are retrieved from memory area 675. A decision is made as to whether the user's financial services card has received updated available funds data (decision 710). If the user's financial services card has received updated available funds data, then decision 710 branches to the "yes" branch whereupon, at step 715, the timestamp corresponding to the newly received available funds data is recorded (stored) in memory area 720. In one embodiment, the timestamp is maintained by a clock within the financial services card while, in another embodiment, the timestamp is included with the message from the financial services provider with the available funds data. At step 725 the available funds data in the received message is parsed, or analyzed. A decision is made as to whether the financial services provider has provided a numeric funds amount as the available funds data or has provided the user-specified funds range that includes the users' current available funds amount (decision 730). If the available funds data is a numeric amount (e.g., the user's actual current available funds available for use with the financial services card, etc.), then decision 730 branches to the "yes" branch to execute steps 735 through 750 that identify the user-specified funds range and associated visual indicator.

At step 735, the first user-specified funds range is selected. At step 740, the selected user-specified funds range is compared with the current available funds amount. A decision is made as to whether the current available funds amount falls within the selected user-specified funds range (decision 745). If the current available funds amount falls outside the selected user-specified funds range, then decision 745 branches to the "no" branch which loops back to select the next user-specified funds range and repeat the comparison. Steps 735 through 745 are performed until the user-specified funds range is identified, at which point decision 745 branches to the "yes" branch. At step 750, the visual indicator(s) that are associated with the identified user-specified funds range are selected.

Returning to decision 730, if the financial services provider sent a message with available funds data that included the selected visual indicator that is associated with the user-specified funds range (e.g., the financial services provider performed steps analogous to steps 735 through 750 to select the appropriate visual indicator based on user-preferences provided to the financial services provider, etc.), then decision 730 branches to the "no" branch whereupon, at step 755, the user's financial services card receives the selected visual indicator(s) from the message received from the financial services provider.

After the visual indicator(s) have been selected (either logic running on the user's financial services card or by logic running on a remote system of the financial services provider), then at step 760, the last update memory area (720) is updated with the visual indicator(s) that have been selected. In addition, at step 760, power is provided to the selected visual indicator(s) (e.g., LEDs 320, etc.) which activates the selected visual indicator(s) so they are visual to the user of the financial services card. Processing then returns to the calling routine (see FIG. 6) at 765.

Returning back to decision 710, if an available funds data message has not been received from the financial services provider, then decision 710 branches to the "no" branch in order to activate the last-known visual indicators. At step 770, the last set of visual indicator(s) is retrieved from last update memory area 720. At step 775, power is sent to the last-known visual indicators. At step 780, the timestamp corresponding to the last-known visual indicators is compared with the current timestamp in order to identify an age of the last available funds data that was received from the financial services provider. A decision is made as to whether the age is stale based on a user-specified threshold (decision 785). For example, a user may specify that if available funds data have not been received within the past hour, then the data is deemed (by the user) to be stale. If the available funds data has not been updated within the user-specified time period (threshold), then decision 785 branches to the "yes" branch whereupon, at step 790, the user of the financial services card is notified of the stale condition of the data via the visual indicator(s) (e.g., pulsing the last-known visual indicators, etc.). On the other hand, if the data is not stale, then decision 785 branches to the "no" branch bypassing step 790. Processing then returns to the calling routine (see FIG. 6) at 795.

Figure 8:
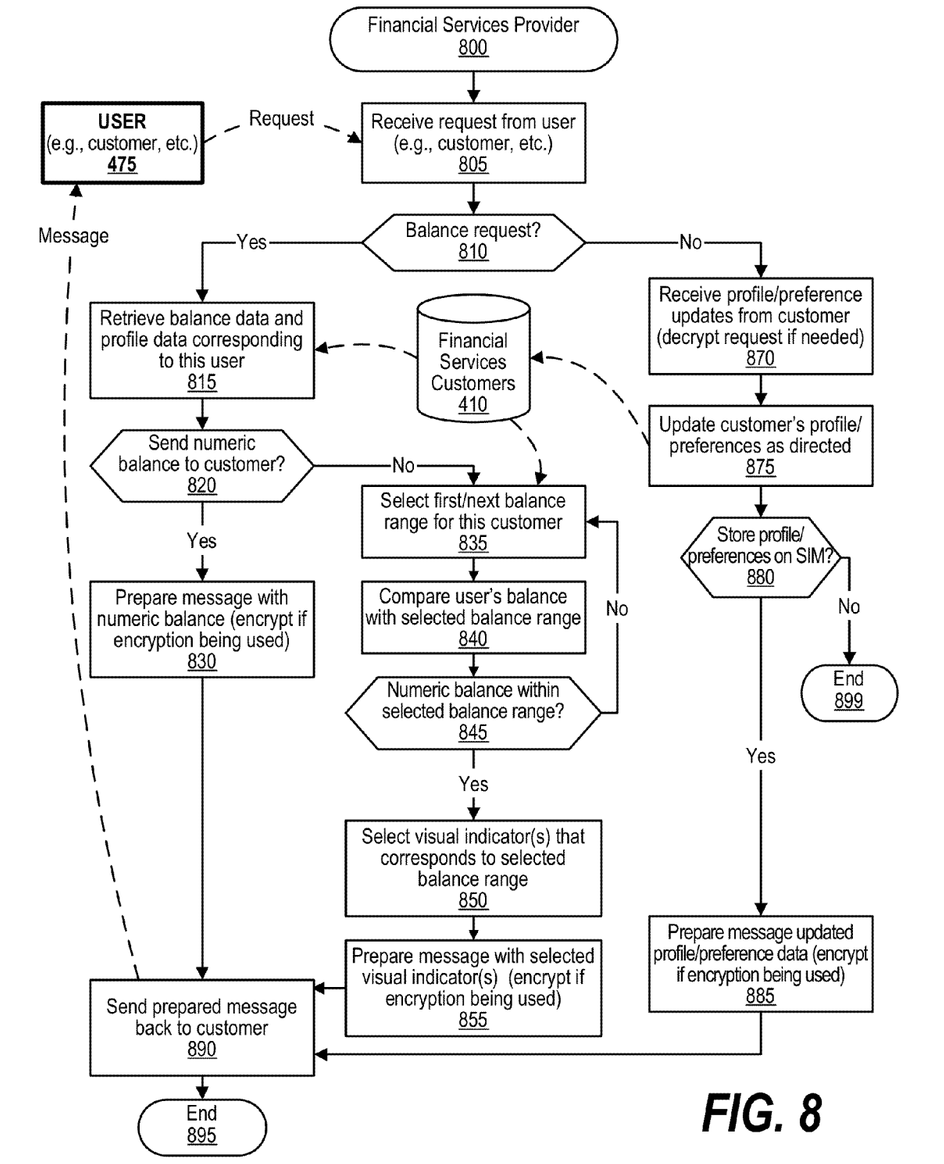
FIG. 8 is a flowchart showing steps performed at the financial services provider to send updated balance data to the financial services card being used by a customer.

FIG. 8 is a flowchart showing steps performed at the financial services provider to send updated balance data to the financial services card being used by a customer. Financial services provider processing commences at 800 whereupon, at step 805, the financial services provider receives a request from a customer (user). The request can be originated from the user's financial services card (e.g., when available funds data is being requested, etc.) or from another information handling system being operated by the user (e.g., when the user is configuring user-specified funds ranges, etc.).

A decision is made as to whether the received request is an available funds data request received from the user's financial services card (decision 810). If the received request is an available funds data request received from the user's financial services card, then decision 810 branches to the "yes" branch whereupon, at step 815, the user's current balance (available funds) is retrieved from financial services provider's data store 410 along with user-specified configuration settings previously received from the user. A decision is made as to whether the financial services provider is to provide a numeric available funds data (e.g., the monetary amount of available funds, etc.) or if the available funds data to be returned to the user is the visual indicator associated with the user-specified funds range that corresponds to the current amount of available funds (decision 820). If the financial services provider is sending the numeric amount of available funds back to the user's financial services card, then decision 820 branches to the "yes" branch whereupon, at step 830, the financial services provider prepares a message with the numeric amount of available funds as the available funds data (and encrypts the data if encryption has been established for this user).

On the other hand, if the financial services provider is providing the visual indicator to the user's financial services card, then decision 8200 branches to the "no" branch to execute steps 835 through 855 that identify the user-specified funds range based on the amount of available funds and the visual indicator associated with the user-specified funds range.

At step 835, the first user-specified funds range is selected from the financial services provider's data store 410 (the user having previously established the user-specified funds ranges). At step 840, the selected user-specified funds range is compared with the current available funds amount. A decision is made as to whether the current available funds amount falls within the selected user-specified funds range (decision 845). If the current available funds amount falls outside the selected user-specified funds range, then decision 845 branches to the "no" branch which loops back to select the next user-specified funds range and repeat the comparison. Steps 835 through 845 are performed until the user-specified funds range is identified, at which point decision 845 branches to the "yes" branch. At step 850, the visual indicator(s) that are associated with the identified user-specified funds range are selected. At step 855, the financial services provider prepares an available funds data message that includes the selected visual indicator(s) that correspond with the user's current available funds amount.

After the available funds data has been gathered (either an actual amount or the visual indicator(s) corresponding to the user-specified range of the actual amount), then, at step 890, the financial services provider sends a message back to the user's financial services card with the available funds data. Financial services provider processing thereafter ends at 895.

Returning to decision 810, if the request received from the user is not a request for available funds data, then decision 810 branches to the "no" branch to process the user-specified funds range request or other user configuration request. Decision 810 branches to the "no" branch whereupon, at step 870, the user-specified funds ranges and/or user configuration updates are received from the user (e.g., from the user using a Web interface from an information handling system such as a desktop or laptop computer system, etc.). At step 875, the user-specified funds ranges and other configuration settings received from the user are used to update the user's configuration/profile maintained by the financial services provider in data store 410. A decision is made as to whether the user-specified funds ranges and other configuration data is stored in a memory (e.g., within a SIM card) located on the user's financial services card (decision 880). If the user-specified funds ranges and/or other configuration settings are stored in a memory with the user's financial services card, then decision 880 branches to the "yes" branch whereupon, at step 885, the financial services provider prepares a message directed to the user's financial services card (obtaining necessary network address information from data store 410) with the message including the user-specified funds ranges and/or other user-specified configuration settings. At step 890, the prepared message is sent to the user's financial services card using the wireless adapter included in the financial services card for reception of the message. Financial services provider processing thereafter ends at 895. Returning to decision 880, if the user-specified funds ranges and other configuration settings are not stored on the memory located at the user's financial services card, then decision 880 branches to the "no" branch whereupon financial services provider processing ends at 899.

Figure 9:
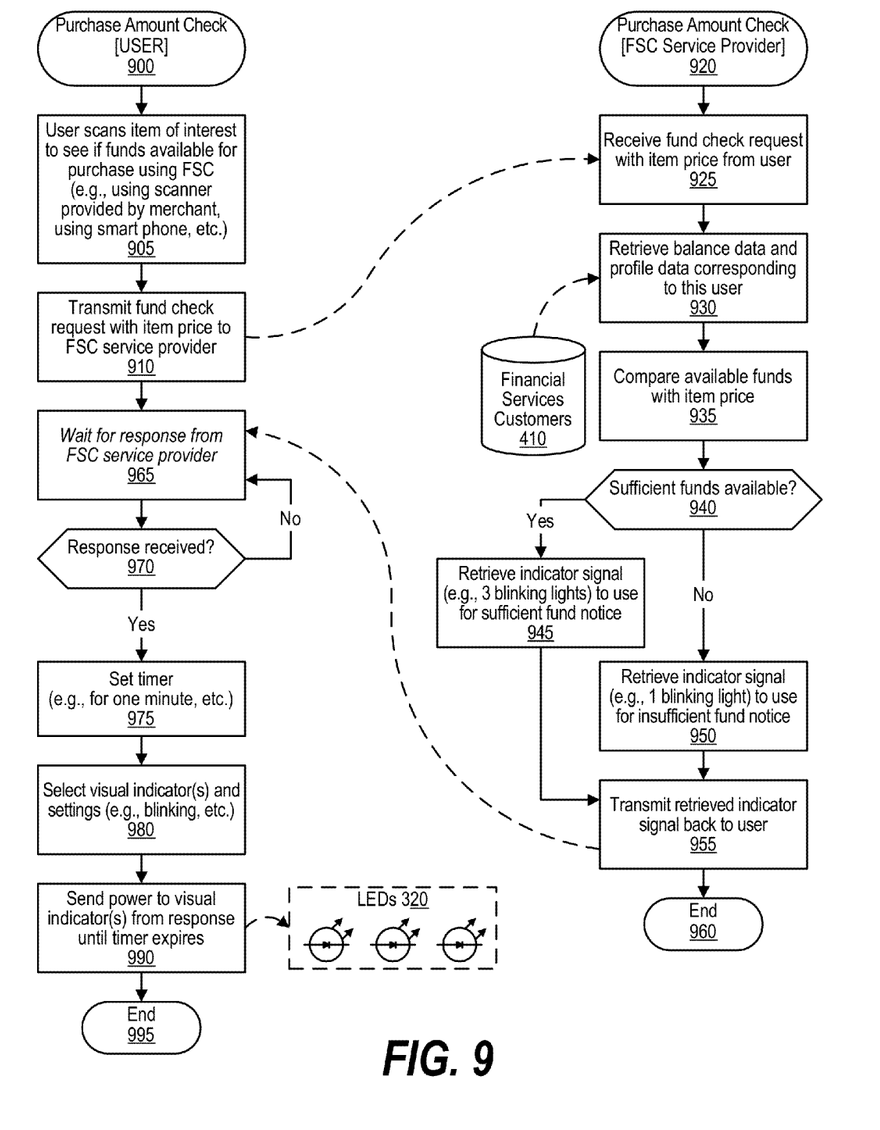
FIG. 9 is a flowchart showing steps performed at both by the user and the logic in the financial services card and the financial services provider to perform a purchase amount check on a particular item.

FIG. 9 is a flowchart showing steps performed at both by the user and the logic in the financial services card and the financial services provider to perform a purchase amount check on a particular item. Processing performed by the user of the financial services card commences at 900 whereupon, at step 905, the user scans an item of interest in order to determine if sufficient funds are available for use with the user's financial services card to purchase the item with the scan including the price of the item of interest (e.g., using a scanner provided by the merchant, using a scanner/camera included on a smart-phone of the user, etc.). At step 910, the request to check for available funds is transmitted to the financial services provider.

Financial services provider processing commences at 920 whereupon, at step 925, the financial services provider receives the request from the user to check whether available funds are available to purchase an item with the request including the price of the item. At step 930, the financial services provider retrieves (from data store 410) the current available funds data (amount) corresponding to the financial services card being used by this user. At step 935, the financial services provider compares the price of the item with the available funds currently available using the financial services card. A decision is made as to whether sufficient funds are available on the financial services card to purchase the item (decision 940). If sufficient funds are available, then decision 940 branches to the "yes" branch whereupon, at step 945, the financial services provider retrieves the visual indicator signal, such as three-blinking visual indicators, from the user-specified settings included in data store 410, with the retrieved settings being those used for sufficient funds notification. On the other hand, if sufficient funds are not available to purchase the item, then decision 940 branches to the "no" branch whereupon, at step 950, the financial services provider retrieves the visual indicator signal, such as a single blinking visual indicator, from the user-specified settings included in data store 410, with the retrieved settings being those used for insufficient funds notification. At step 955, the retrieved indicator signal (for either sufficient or insufficient funds notification) is transmitted from the financial services provider back to the user's financial services card. Financial services provider processing thereafter ends at 960.

Returning to processing performed at the user's financial services card, at step 965 the financial services card waits for a response for the purchase amount check to be received from the financial services provider. A decision is made as to whether a response has been received from the financial services provider (decision 970). If a response has not yet been received, then decision 970 branches to the "no" branch which loops back to continue waiting for the response from the financial services provider. This looping (polling) continues until a response is received from the financial services provider, at which point decision 970 branches to the "yes" branch to process the received indicator.

At step 975, a user-specified timer is set for a length of time that the visual indicators are to indicate whether sufficient funds are available to purchase the item (e.g., for one minute, etc.). At step 980, the visual indicator(s) and display settings (e.g., blinking, etc.) are selected based on the response received from the financial services provider. In one embodiment, the logic in the financial services card receives a prospective balance—the available funds balance that will result if the user purchases the prospective purchase items. In this embodiment, the financial services provider sends back the prospective available funds data based on the price of the prospective purchase items (subtracting the price of the prospective purchase items from the current balance). The financial services card receives the prospective available funds data and uses logic shown in FIG. 7 to activate the appropriate visual indicators. In this case, the activated visual indicators would show the user what user-specified funds range would result if the purchase was made. In this manner, a user that wishes to keep a particular balance (e.g., in a checking account associated with a debit card that charges a service fee if a balance is reduced to a particular amount, etc.), could view the activated prospective visual indicators and decide whether to purchase the items based on whether the purchase would place the balance in a different user-specified funds range. At step 990, the visual indicators (320) are activated based on the response received from the financial services provider until the timer expires (e.g., display the results for one minute, etc.). User financial services card processing thereafter ends at 995.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:
    configuring a plurality of user-specified funds ranges;
    associating a unique set of one or more visual indicators with each of the user-specified funds ranges;
    storing the user-specified funds ranges and the associated visual indicators in a memory area included in a financial services card and accessible by a logic circuit included in the financial services card;
    receiving, from a financial services provider, an available funds data at the financial services card;
    comparing, by one or more processors, the received available funds data with the plurality of user-specified funds ranges, the comparison resulting in matching the received available funds data to one of the user-specified funds ranges and an associated set of one or more visual indicators; and
    notifying a user, by visibly activating the associated visual indicators, of a current balance within the matched user-specified funds range.

2. The method of claim 1, wherein the visual indicators are light emitting diodes (LEDs), and wherein power that is transmitted to the LEDs is provided by a piezoelectric material included with the financial services card, and wherein the piezoelectric material is electrically charged in response to a physical manipulation of the financial services card by the user.

3. The method of claim 1, further comprising:
    generating power at the financial services card, wherein the power is generated by a physical manipulation of the financial services card which results in a piezoelectric effect by a piezoelectric material included in the financial services card;
    providing an electric current resulting from the piezoelectric effect to a logic circuit included in the financial services card and to the visual indicators; and
    wirelessly transmitting an available funds request addressed to the financial services provider via a computer network, wherein the available funds request is transmitted over an antenna integrated in the financial services card.

4. The method of claim 3, wherein the available funds request is periodically sent based on a timer event occurring in the logic circuit.

5. The method of claim 1, further comprising:
    storing the activated associated visual indicators in the memory area along with a timestamp corresponding to the received available funds data;
    comparing the stored timestamp to a current timestamp, the comparison resulting in a last balance update age; and
    displaying a stale data visual indicator using one or more of the visual indicators in response to the last balance update age being older than a threshold, wherein the stale data visual indicator informs the user that the available funds data corresponding to the activated associated selected visual indicators is stale.

6. The method of claim 1, further comprising:
    transmitting a price corresponding to one or more prospective purchase items to the financial services provider;
    receiving, at the financial services card from the financial services provider, an available funds response;
    determining whether sufficient funds are available based on the available funds response;
    activating a first set of one or more of the visual indicators in response to the determination of available sufficient funds to purchase the prospective purchase items; and
    activating a second set of one or more of the visual indicators in response to the determination of unavailable sufficient funds to purchase the prospective purchase items.

7. The method of claim 1, further comprising:
    identifying one or more prospective purchase items and a price corresponding to the one or more prospective purchase items;
    receiving, at the financial services card from the financial services provider, an available funds response;

comparing the received available funds response with the plurality of user-specified funds ranges, the comparison resulting in a second matching of one of the user-specified funds ranges and a second associated set of one or more associated visual indicators; and notifying the user, by visibly activating the second set of associated visual indicators, of a prospective balance within the second matched user-specified funds range.

8. An information handling system included in a financial services card, wherein the information handling system comprises:

one or more processors;

a memory coupled to at least one of the processors;

a wireless adapter, accessible by at least one of the processors, that transmits and receives signals over a wireless network;

a plurality of visual indicators accessible by at least one of the processors;

a piezoelectric material that provides an electric current to the processors, the memory, the wireless adapter, and the plurality of visual indicators; and a set of instructions stored in the memory and executed by at least one of the processors, wherein the set of instructions perform actions of:

configuring a plurality of user-specified funds ranges;

associating a unique set of one or more of the visual indicators with each of the user-specified funds ranges;

storing the user-specified funds ranges and the associated visual indicators in the memory;

receiving, at the wireless adapter, an available funds data;

comparing the received available funds data with the plurality of user-specified funds ranges, the comparison resulting in matching the received available funds data to one of the user-specified funds ranges and an associated set of one or more visual indicators; and notifying a user, by visibly activating the associated visual indicators, of a current balance within the matched user-specified funds range.

9. The information handling system of claim 8, wherein the visual indicators are light emitting diodes (LEDs), and wherein the piezoelectric material is electrically charged in response to a physical manipulation of the financial services card by the user.

10. The information handling system of claim 8, wherein the actions further comprise:

generating power at the financial services card, wherein the power is generated by a physical manipulation of the financial services card which results in a piezoelectric effect by a piezoelectric material included in the financial services card;

providing an electric current resulting from the piezoelectric effect to a logic circuit included in the financial services card and to the visual indicators; and wirelessly transmitting an available funds request addressed to the financial services provider via a computer network, wherein the available funds request is transmitted over an antenna integrated in the financial services card.

11. The information handling system of claim 10, wherein the available funds request is periodically sent based on a timer event occurring in the logic circuit.

12. The information handling system of claim 8, wherein the actions further comprise:

storing the activated associated visual indicators in the memory area along with a timestamp corresponding to the received available funds data;

comparing the stored timestamp to a current timestamp, the comparison resulting in a last balance update age; and displaying a stale data visual indicator using one or more of the visual indicators in response to the last balance update age being older than a threshold, wherein the stale data visual indicator informs the user that the available funds data corresponding to the activated associated visual indicators is stale.

13. The information handling system of claim 8, wherein the actions further comprise:

transmitting a price corresponding to one or more prospective purchase items to the financial services provider;

receiving, at the financial services card from the financial services provider, an available funds response;

determining whether sufficient funds are available based on the available funds response;

activating a first set of one or more of the visual indicators in response to the determination of available sufficient funds to purchase the prospective purchase items; and activating a second set of one or more of the visual indicators in response to the determination of unavailable sufficient funds to purchase the prospective purchase items.

14. The information handling system of claim 8, wherein the actions further comprise:

identifying one or more prospective purchase items and a price corresponding to the one or more prospective purchase items;

receiving, at the financial services card from the financial services provider, an available funds response;

comparing the received available funds response with the plurality of user-specified funds ranges, the comparison resulting in a second matching of one of the user-specified funds range and a second associated set of one or more visual indicators; and notifying the user, by visibly activating the second set of associated visual indicators, of a prospective balance within the second matched user-specified funds range.

15. A computer program product stored in a computer readable hardware storage device, comprising functional descriptive material that, when executed by an information handling system, causes the information handling system to perform actions that include:

configuring a plurality of user-specified funds ranges;

associating a unique set of one or more visual indicators with each of the user-specified funds ranges;

storing the user-specified funds ranges and the associated visual indicators in a memory area included in a financial services card and accessible by a logic circuit included in the financial services card;

receiving, from a financial services provider, an available funds data at the financial services card;

comparing the received available funds data with the plurality of user-specified funds ranges, the comparison resulting in matching the received available funds data to one of the user-specified funds ranges and an associated set of one or more visual indicators; and notifying a user, by visibly activating the associated visual indicators, of a current balance within the matched user-specified funds range.

16. The computer program product of claim 15, wherein the visual indicators are light emitting diodes (LEDs), and wherein power that is transmitted to the LEDs is provided by a piezoelectric material included with the financial services card, and wherein the piezoelectric material is electrically charged in response to a physical manipulation of the financial services card by the user.

17. The computer program product of claim 15, wherein the actions further comprise:
   generating power at the financial services card, wherein the power is generated by a physical manipulation of the financial services card which results in a piezoelectric effect by a piezoelectric material included in the financial services card;
   providing an electric current resulting from the piezoelectric effect to a logic circuit included in the financial services card and to the visual indicators; and
   wirelessly transmitting an available funds request addressed to the financial services provider via a computer network, wherein the available funds request is transmitted over an antenna integrated in the financial services card.

18. The computer program product of claim 17, wherein the available funds request is periodically sent based on a timer event occurring in the logic circuit.

19. The computer program product of claim 15, wherein the actions further comprise:
   storing the activated associated visual indicators in the memory area along with a timestamp corresponding to the received available funds data;
   comparing the stored timestamp to a current timestamp, the comparison resulting in a last balance update age; and
   displaying a stale data visual indicator using one or more of the visual indicators in response to the last balance update age being older than a threshold, wherein the stale data visual indicator informs the user that the available funds data corresponding to the activated associated visual indicators is stale.

20. The computer program product of claim 15, wherein the actions further comprise:
   transmitting a price corresponding to one or more prospective purchase items to the financial services provider;
   receiving, at the financial services card from the financial services provider, an available funds response;
   determining whether sufficient funds are available based on the available funds response;
   activating a first set of one or more of the visual indicators in response to the determination of available sufficient funds to purchase the prospective purchase items; and
   activating a second set of one or more of the visual indicators in response to the determination of unavailable sufficient funds to purchase the prospective purchase items.

21. The computer program product of claim 15, wherein the actions further comprise:
   identifying one or more prospective purchase items and a price corresponding to the one or more prospective purchase items;
   receiving, at the financial services card from the financial services provider, an available funds response;
   comparing the received available funds response with the plurality of user-specified funds ranges, the comparison resulting in a second matching of one of the user-specified funds range and a second associated set of one or more associated visual indicators; and
   notifying the user, by visibly activating the second set of associated visual indicators, of a prospective balance within the second matched user-specified funds range.

\* \* \* \* \*